United States Patent
Huang

(10) Patent No.: US 7,643,680 B2
(45) Date of Patent: *Jan. 5, 2010

(54) METHOD OF CALIBRATING IMAGE LUMINANCE VALUES

(75) Inventor: Chih-Fang Huang, Longshan Village, Fangliao Township, Pingtung County (TW)

(73) Assignee: Avision Inc. (TW)

( * ) Notice: Subject to any disclaimer, the term of this patent is extended or adjusted under 35 U.S.C. 154(b) by 647 days.

This patent is subject to a terminal disclaimer.

(21) Appl. No.: 11/274,231

(22) Filed: Nov. 16, 2005

(65) Prior Publication Data

US 2006/0103900 A1    May 18, 2006

(30) Foreign Application Priority Data

Nov. 16, 2004    (TW) .............................. 93135157 A

(51) Int. Cl.
*G06K 9/00*    (2006.01)
*H04N 9/68*    (2006.01)

(52) U.S. Cl. ..................... 382/167; 382/274; 348/238

(58) Field of Classification Search ............... 382/100, 382/103, 106, 107, 112, 113, 154, 172, 162–168, 382/181, 190, 194, 199, 203, 209, 221, 232, 382/237, 254, 274–276, 286, 291, 305; 348/238, 348/187; 358/447, 474

See application file for complete search history.

(56) References Cited

U.S. PATENT DOCUMENTS

| 4,912,558 | A | * | 3/1990 | Easterly et al. | ............. 358/447 |
| 4,962,425 | A | * | 10/1990 | Rea | ............. 348/187 |
| 6,614,471 | B1 | * | 9/2003 | Ott | ............. 348/238 |
| 6,950,551 | B2 | * | 9/2005 | Murashita et al. | ............. 382/166 |
| 7,006,246 | B1 | * | 2/2006 | Nakajima | ............. 358/1.9 |
| 7,099,054 | B2 | * | 8/2006 | Shih et al. | ............. 358/474 |
| 7,424,170 | B2 | * | 9/2008 | Steinberg et al. | ............. 382/275 |

* cited by examiner

*Primary Examiner*—Seyed Azarian
(74) *Attorney, Agent, or Firm*—Rabin & Berdo, PC

(57)    ABSTRACT

A method of calibrating image luminance values is provided. At first, a calibration chart is scanned, and a dark actual luminance value and a white actual luminance value are obtained accordingly. Next, a document is scanned, and a scan luminance value is obtained accordingly. Then, a white ideal luminance value, a dark ideal luminance value, an ideal luminance value and a predetermined calibrated luminance value are provided. Next, a calibrated luminance value is determined according to the dark actual luminance value, the white actual luminance value, the white ideal luminance value, the dark ideal luminance value, the ideal luminance value, the predetermined calibrated luminance value and the scan luminance value.

16 Claims, 6 Drawing Sheets

METHOD OF CALIBRATING IMAGE LUMINANCE VALUES

This application claims the benefit of Taiwan application Serial No. 93135157, filed Nov. 16, 2004, the subject matter of which is incorporated herein by reference.

BACKGROUND OF THE INVENTION

1. Field of the Invention

The invention relates in general to a method of calibrating image luminance values, and more particularly to a method of calibrating the scan luminance value according to an ideal luminance value and a predetermined calibrated luminance value.

2. Description of the Related Art

With development and advancement in science and technology, integration and application of multi-media devices currently have become a trend. Multi-media comprise various data types, such as texts, images, voices, and etc. For data to be presented in the forms of multi-media, several multi-media devices capable of processing images or voices have been invented. In terms of image processing, scanner is one of the most often used image processing devices.

A scanner utilizing conventional image calibration method usually comprises a base, a cover, a platform, a chassis and a white calibration chart. The cover is detachably disposed on the base and can be opened and closed atop the base. The platform is disposed on a top plate of the base for accommodating a document. The white calibration chart is disposed on the inner wall of the top plate of the base and positioned to one side of the platform. The chassis is moveably disposed inside the base and is for scanning the document on the platform and the white calibration chart. Besides, the chassis comprises a light source, a reflector, a lens, an optical sensor, and a charge coupling device (CCD). The light source can be a cold cathode fluorescent lamp (CCFL), a hot cathode fluorescent lamp or a light emitting diode (LED), for instance. The functions of the other elements are disclosed below. Conventionally, to calibrate the luminance value of an image signal outputted by a number of photo-sensing pixels of the optical sensor via the charge coupling device, both of a white calibration and a black calibration of an image signal are required, and illustrated with accompanied drawings.

Referring to FIG. 1, a flowchart of a conventional method of calibrating image luminance values for a scanner is shown. In FIG. 1, firstly, in step 11, execute a white shading correction. The scanner turns on the light source to illuminate the white calibration chart with a light beam. The reflector reflects the reflected light beam by the white calibration chart to the lens. The lens receives and focuses the light to form an image on each pixel of the charge coupling device. Each pixel outputs a corresponding white induced voltage, which is converted into a white actual luminance value by the scanner. Next, in step 12, execute a dark shading correction. When the cover is closed on the base and the scanner turns off the light source, each pixel outputs a corresponding dark induced voltage, which is converted into a dark actual luminance value by the scanner. The dark actual luminance value is smaller than the white actual luminance value.

Then, in step 13, scan the document. Each pixel obtains a corresponding scan inducted voltage, which is converted into a scan luminance value. Next, in step 14, provide a white ideal luminance value and a dark ideal luminance value. The color density of the white calibration chart can be 0.1 for instance. A calorimeter measures luminance value of the white calibration chart and obtains a white ideal luminance value accordingly. After that, in step 15, calibrate the scan luminance value and obtain a calibrated luminance value according to the white actual luminance value, the dark actual luminance value, the white ideal luminance value, and the dark ideal luminance value. Suppose the white actual luminance value, the dark actual luminance value, the white ideal luminance value, the dark ideal luminance value, the scan luminance value and the calibrated luminance value are denoted by VW, VD, TW, TD, VP and OP, then $OP=TD+(VP-VD)*[(VP-TD)/(TW-TD)]$. VD is also called a dark luminance offset value. $(VP-TD)/(TW-TD)$ is also called a luminance gain value.

When the conventional scanner calibrates the data outputted by the charge coupling device, the luminance of the calibration chart has to maintain uniform, and the distance and angle between the charged coupled device and the calibration chart when the charged coupled device is at white shading correction have to be similar to the distance and angle between the charged coupled device and the document when the charged coupled device is scanning a document. However, after the scanner is used over a period of time, the calibration chart might have non-uniform luminance if the calibration chart comes off the scanner or its coating peels off. Besides, if the distance and angle between the charged coupled device and the calibration chart when the charged coupled device is at white shading correction differ with the distance and angle between the charged coupled device and the document when the charged coupled device is scanning a document, the corresponding white ideal luminance value of a pixel might differ from one to another. Under such circumstance, the conventional method of calibrating scan luminance value would lead to erroneous calibrated luminance values, the image composed of calibrated luminance values would be distorted, largely affecting the scanning quality of a scanner.

SUMMARY OF THE INVENTION

It is therefore the object of the invention to provide a method of calibrating image luminance values. The design of calibrating the scan luminance value according to an ideal luminance value and a predetermined calibrated luminance value ascertains uniformity of luminance when a document is scanned by a scanner, even if the calibration chart may come off the scanner or the coating of the calibration chart may peel off, or that the distance and angle between the photo-sensing module and the calibration chart when at white-shading correction differ with the distance and angle between the photo-sensing module and the document. However, the invention can prevent image composed of calibrated luminance values from being distorted and greatly enhance scanning quality.

According to an object of the invention, a method of calibrating image luminance values is provided. At first, a calibration chart is scanned, and a first dark actual luminance value and a first white actual luminance value are obtained accordingly. Next, a document is scanned, and a scan luminance value is obtained accordingly. Then, a white ideal luminance value, a dark ideal luminance value, an ideal luminance value and a predetermined calibrated luminance value are provided. Next, a calibrated luminance value is determined according to the first dark actual luminance value, the first white actual luminance value, the white ideal luminance value, the dark ideal luminance value, the ideal luminance value, the predetermined calibrated luminance value and the scan luminance value.

The step of providing the white ideal luminance value, the dark ideal luminance value, the ideal luminance value and the predetermined calibrated luminance value further includes the following sub-steps. At first, a uniform calibration chart is scanned, and a second dark actual luminance value and a second white actual luminance value are obtained accordingly. Next, a dark ideal luminance value and a white ideal luminance value are provided. Then, a predetermined calibration chart is scanned, and an actual luminance value is obtained accordingly. Next, the predetermined calibrated luminance value is determined according to the second dark actual luminance value, the second white actual luminance value, the white ideal luminance value, the dark ideal luminance value and the actual luminance value. Then, the ideal luminance value corresponding to the predetermined calibration chart and the predetermined calibrated luminance value are stored Other objects, features, and advantages of the invention will become apparent from the following detailed description of the preferred but non-limiting embodiments. The following description is made with reference to the accompanying drawings.

DETAILED DESCRIPTION OF THE INVENTION

First Embodiment

Figure 1:
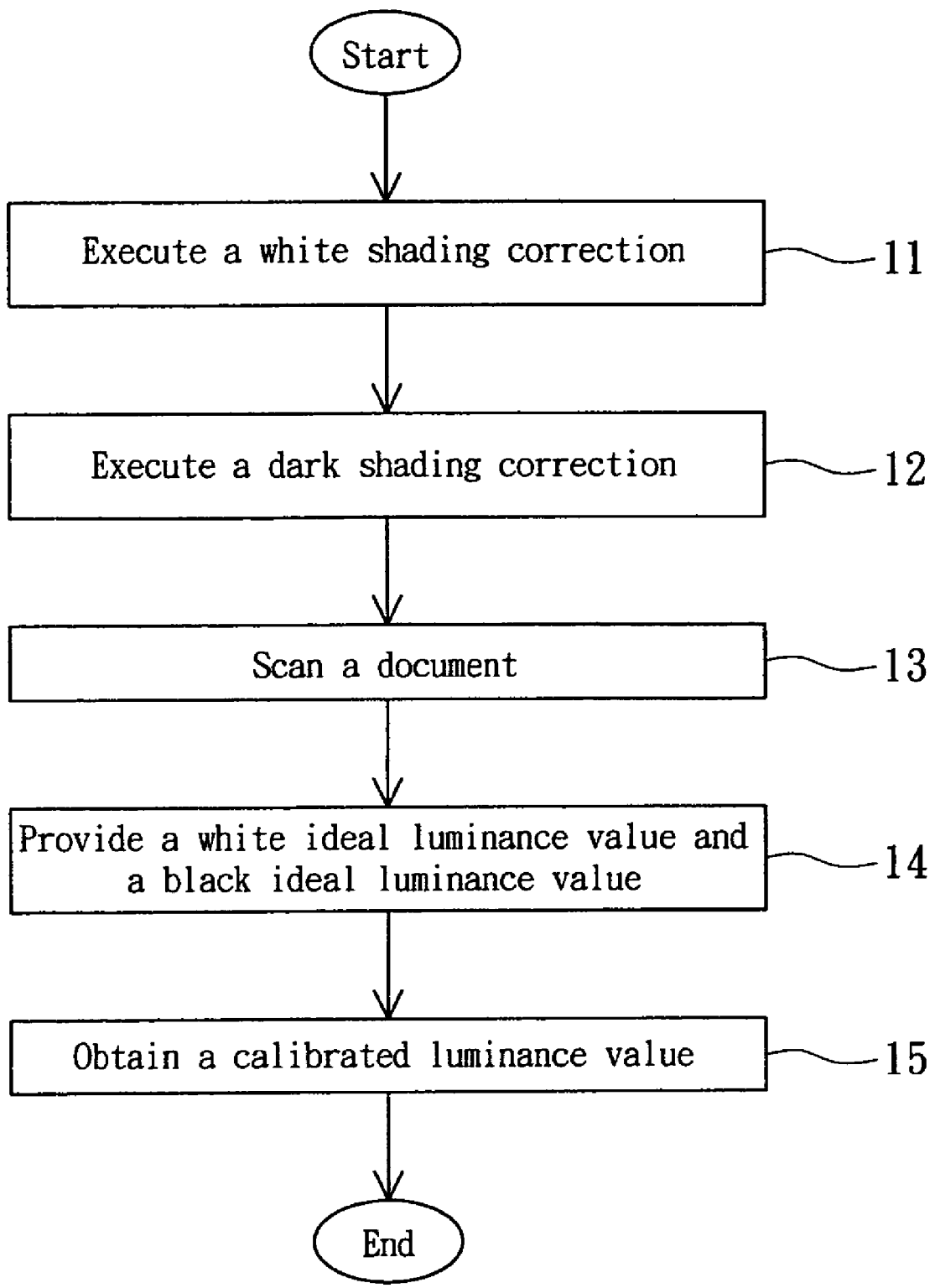
FIG. 1 (Prior Art) is a flowchart of a conventional method of calibrating image luminance values for a scanner.
Figure 2:
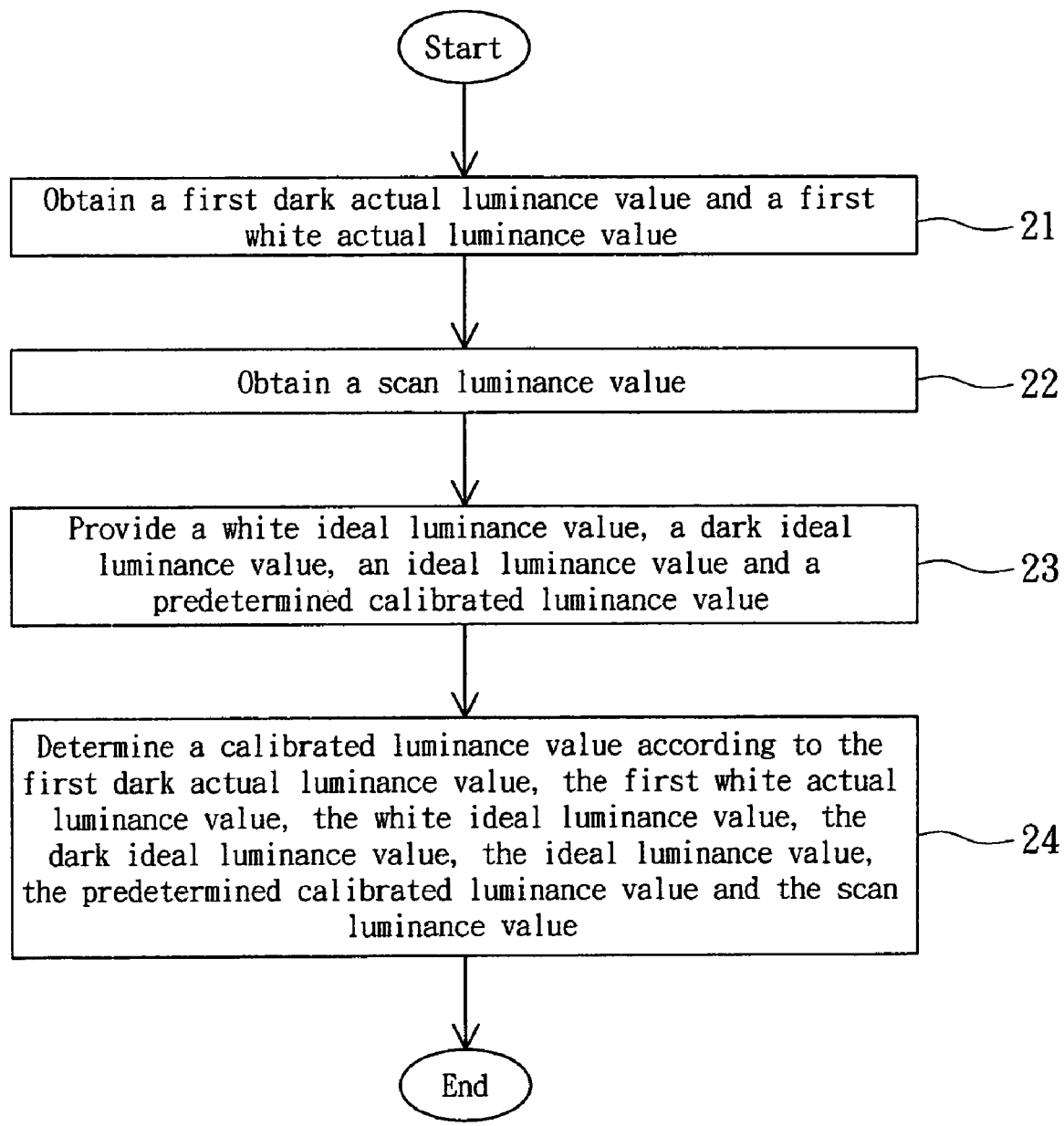
FIG. 2 is a flowchart of a method of calibrating image luminance values according to a first embodiment of the invention.

Referring to FIG. 2, a flowchart of a method of calibrating image luminance values according to a first embodiment of the invention is shown. The present embodiment is exemplified by using one of pixels of a photo-sensing module to sense one of the red light (R), the green light (G) and the blue light (B). In FIG. 2, at first, the method begins at step 21, a calibration chart is scanned during a first white-shading procedure and a first dark-shading procedure, and a first dark actual luminance value and a first white actual luminance value are obtained accordingly. Next, proceed to step 22, a document is scanned, and a scan luminance value is obtained accordingly. Then, proceed to step 23, a white ideal luminance value, a dark ideal luminance value, an ideal luminance value and a predetermined calibrated luminance value are provided. Next, proceed to step 24, a calibrated luminance value is determined according to the first dark actual luminance value, the first white actual luminance value, the white ideal luminance value, the dark ideal luminance value, the ideal luminance value, the predetermined calibrated luminance value and the scan luminance value. If the first dark actual luminance value, the first white actual luminance value, the white ideal luminance value, the dark ideal luminance value, the ideal luminance value, the predetermined calibrated luminance value, the scan luminance value and the calibrated luminance value are respectively equal to VD1, VW1, TW, TD, IB, SB, FI and FO, then FO={TD+[FI−VD1]*[(TW−TD)/(VW1−VD1)]}*(IB/SB).

Figure 3:
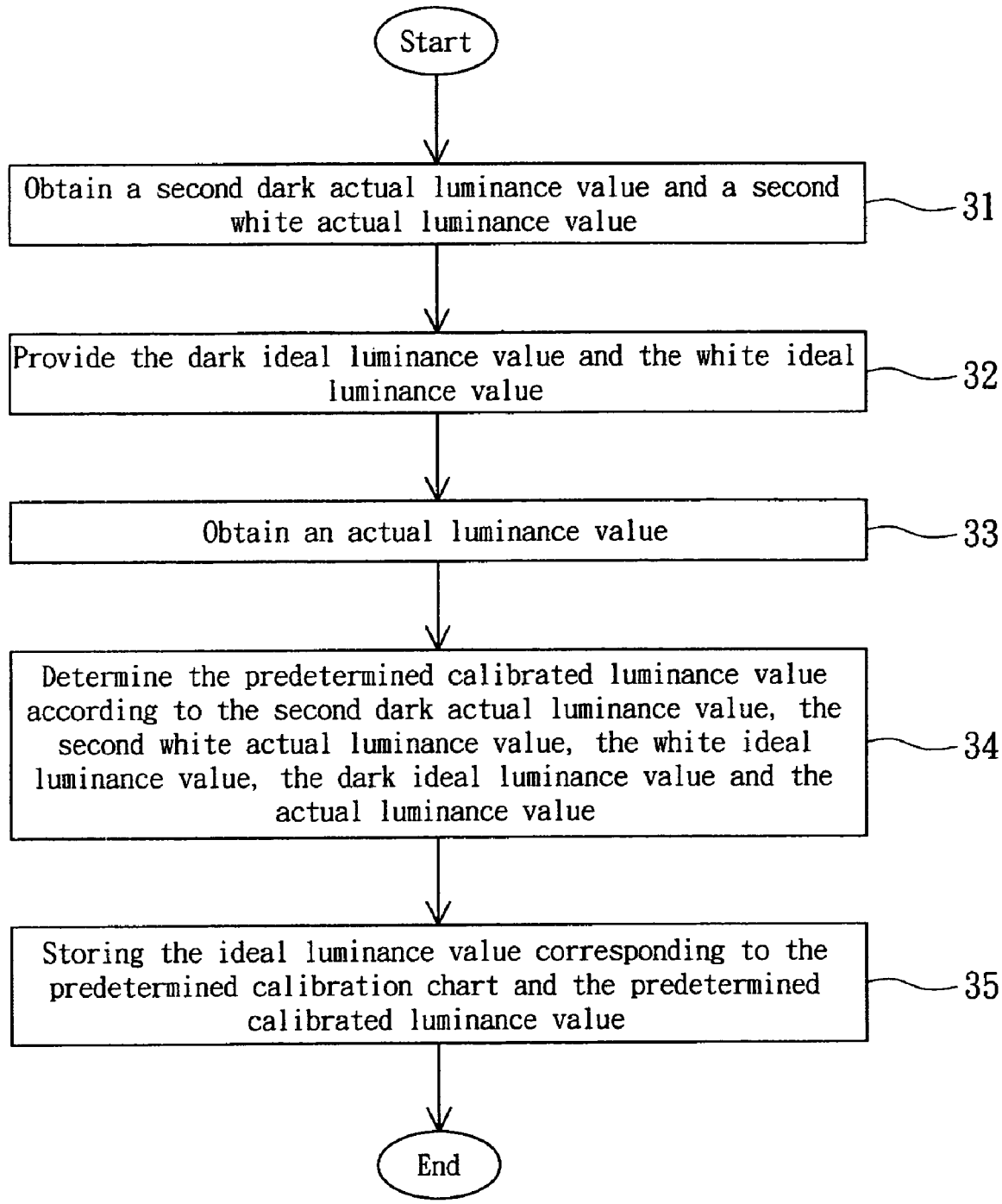
FIG. 3 is a flowchart of providing a white ideal luminance value, a dark ideal luminance value, an ideal luminance value and a predetermined calibrated luminance value according to step 23 of FIG. 2.

The step 23 of providing a white ideal luminance value, a dark ideal luminance value, an ideal luminance value and a predetermined calibrated luminance value further includes the following sub-steps as shown in FIG. 3. At first, in step 31, a uniform calibration chart is scanned during a second white-shading procedure and a second dark-shading procedure, and a second dark actual luminance value and a second white actual luminance value are obtained accordingly. Next, proceed to step 32, a dark ideal luminance value and a white ideal luminance value are provided. Then, proceed to step 33, a predetermined calibration chart is scanned, and an actual luminance value is obtained accordingly. Next, proceed to step 34, a predetermined calibrated luminance value is determined according to the second dark actual luminance value, the second white actual luminance value, the white ideal luminance value, the dark ideal luminance value and the actual luminance value. Then, proceed to step 35, a corresponding ideal luminance value of the predetermined calibration chart and the predetermined calibrated luminance value are stored. If the second dark actual luminance value, the second white actual luminance value, the white ideal luminance value, the dark ideal luminance value, the actual luminance value and the predetermined calibrated luminance value are respectively equal to VD2, VW2, TW, TD, B1 and SB, then SB=TD+(B1−VD2)*[(TW−TD)/(VW2−VD2)].

The steps of FIG. 3 can be performed before the step 21. Therefore, before a scanner leaves the factory, a white-shading procedure and a dark-shading procedure are performed on a uniform calibration chart, and a predetermined calibration chart is scanned to store the corresponding ideal luminance value of the predetermined calibration chart and the predetermined calibrated luminance value determined by the predetermined calibration chart in one of the memory units of the scanner. Whenever the scanner performs the white-shading procedure and the dark-shading procedure before scanning a document and then continues to scan the document, the scanner can access the corresponding ideal luminance value of the predetermined calibration chart and the predetermined calibrated luminance value from the memory. A calibrating luminance value is determined according to the ideal luminance value, the predetermined calibrated luminance value, the first dark actual luminance value, the first white actual luminance value, the white ideal luminance value, the dark ideal luminance value and the scan luminance value.

Despite that luminance non-uniformity might occur if the calibration chart come off the module or the coating of the calibration chart peels off, or if the distance and angle between the photo-sensing module and the calibration chart when the photo-sensing module is in the white-shading procedure differ with the distance and angle between the photo-sensing module and the document when the photo-sensing module is scanning the document, the method still ascertains a uniformed luminance when the scanner scans a document and prevents the image distortion caused by the combination of calibrated luminance values, greatly enhancing scanning quality of a scanner.

Second Embodiment

Figure 4:
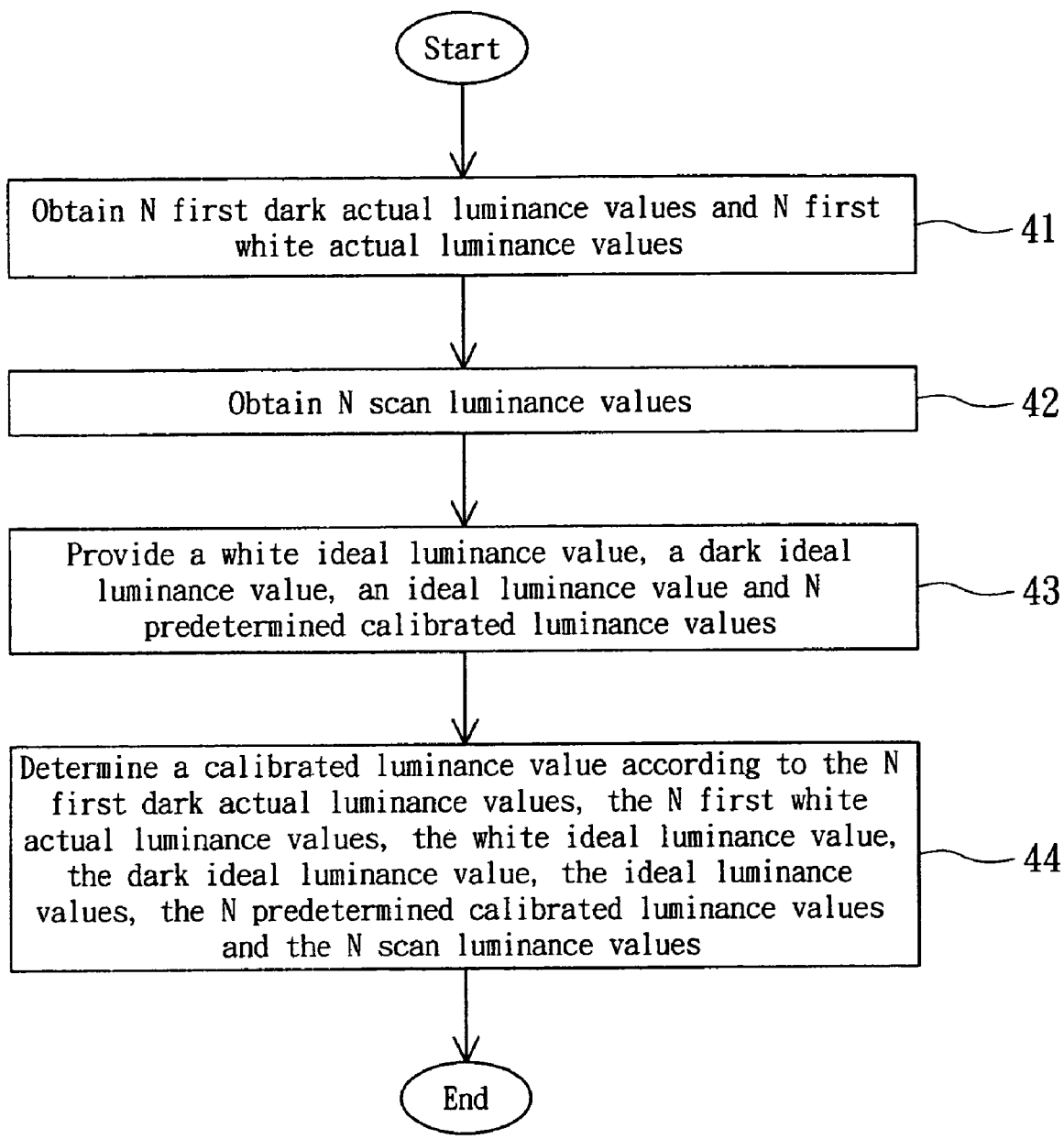
FIG. 4 is a flowchart of a method of calibrating image luminance values according to a second embodiment of the invention.

Referring to FIG. 4, a flowchart of a method of calibrating image luminance values according to a second embodiment of the invention is shown. The present embodiment is exemplified by using N pixels of a photo-sensing module to sense one of the red light (R), the green light (G) and the blue light (B), N is a positive integer larger than 2. In FIG. 4, at first, the method begins at step 41, a calibration chart is scanned during a first white-shading procedure and a first dark-shading procedure, and N first dark actual luminance values and N first white actual luminance values are obtained accordingly. Next, proceed to step 42, a document is scanned, and N scan luminance values are obtained accordingly. Then, proceed to step 43, a white ideal luminance value, a dark ideal luminance value, an ideal luminance value and N predetermined calibrated luminance values are provided. Then, proceed to step 44, N calibrated luminance values are determined according to the N first dark actual luminance values, the N first white actual luminance values, the white ideal luminance value, the dark ideal luminance value, the ideal luminance value, the N predetermined calibrated luminance values and the N scan luminance values.

Figure 5:
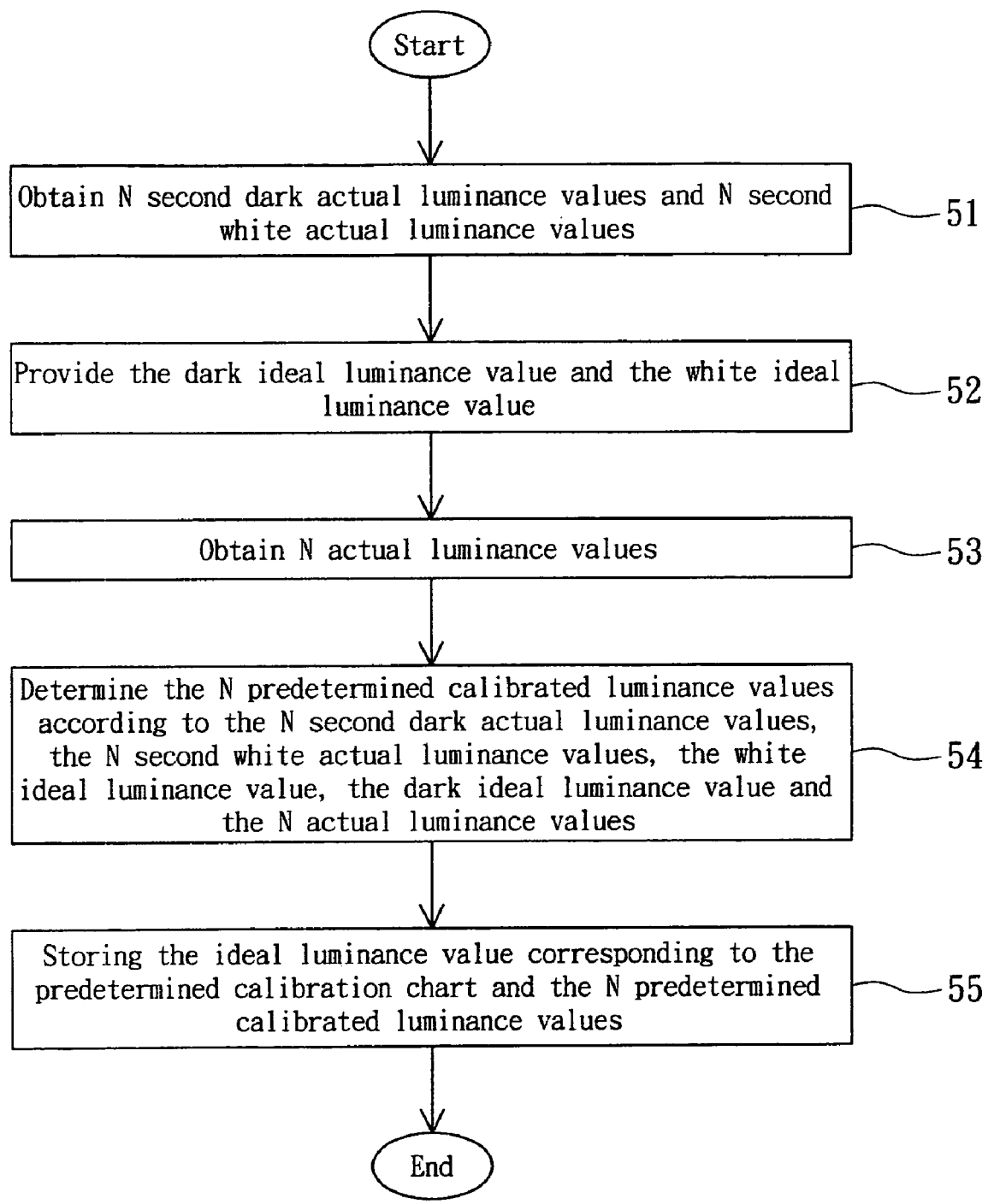
FIG. 5 is a flowchart of providing a white ideal luminance value, a dark ideal luminance value, an ideal luminance value and N predetermined calibrated luminance values according to step 43 of FIG. 4.

The step 44 of providing a white ideal luminance value, a dark ideal luminance value, an N ideal luminance values and an N predetermined calibrated luminance values further includes the following sub-steps as shown in FIG. 5. In step 51, a uniform calibration chart is scanned during a second white-shading procedure and a second dark-shading procedure, and N second dark actual luminance values and N second white actual luminance values are obtained accordingly. Next, proceed to step 52, a dark ideal luminance value and a white ideal luminance value are provided. Then, proceed to step 53, a predetermined calibration chart is scanned, and N actual luminance values are obtained accordingly. Next, proceed to step 54, N predetermined calibrated luminance values are determined according to the N second dark actual luminance values, the N second white actual luminance values, the white ideal luminance value, the dark ideal luminance value and the N actual luminance values. Then, proceed to step 55, a corresponding ideal luminance value of the predetermined calibration chart and the N predetermined calibrated luminance values are stored.

Figure 6:
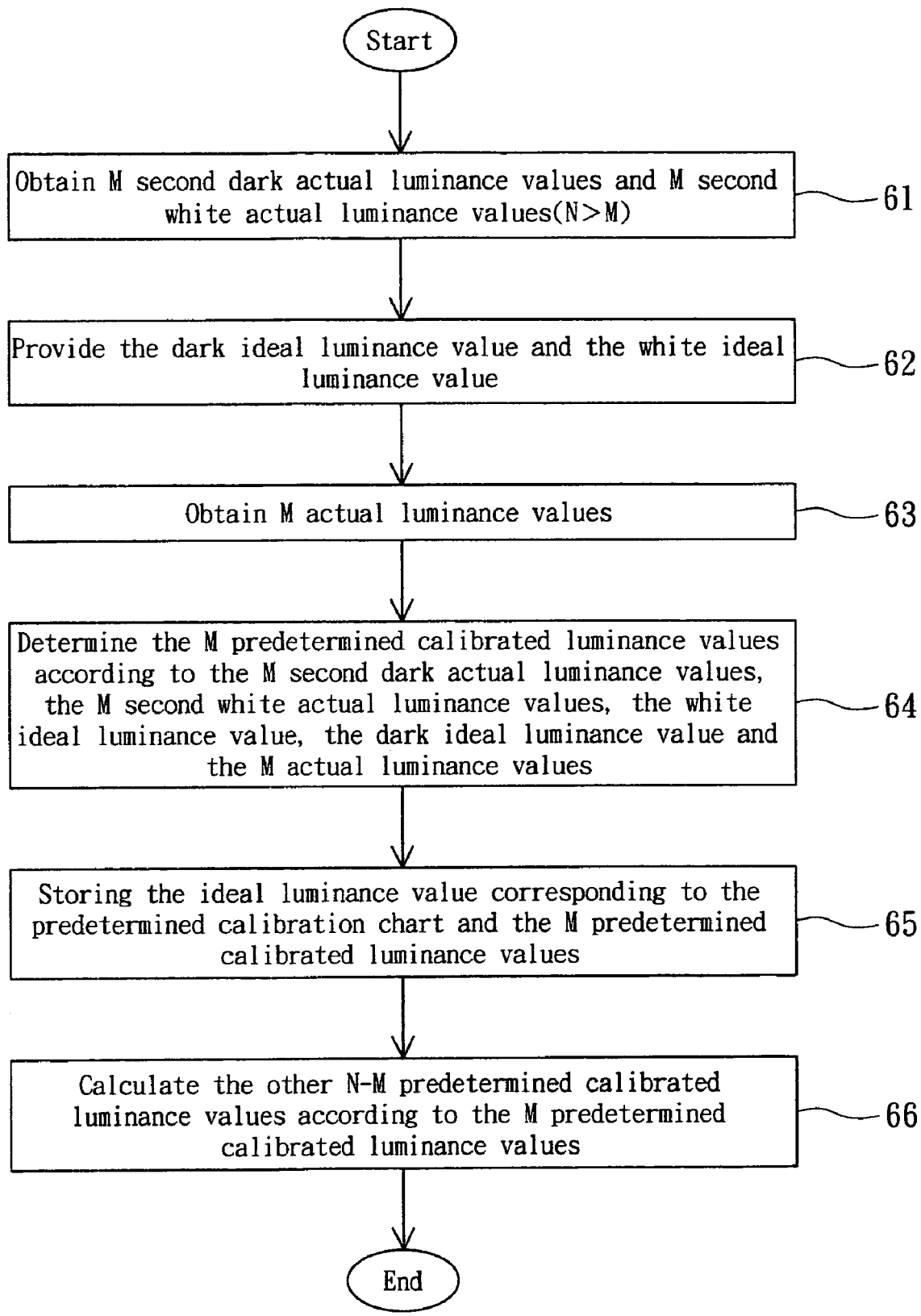
FIG. 6 is another flowchart of providing a white ideal luminance value, a dark ideal luminance value, an ideal luminance value and N predetermined calibrated luminance values according to step 43 of FIG. 4.

In order to save the memory space occupied by the predetermined calibrated luminance values, the step 44 further includes the following sub-steps as shown in FIG. 6. At first, in step 61, a uniform calibration chart is scanned during a second white-shading procedure and a second dark-shading procedure, M corresponding second dark actual luminance values and M corresponding second white actual luminance values of M pixels are obtained accordingly, M is a positive integer smaller than N. Next, proceed to step 62, a dark ideal luminance value and a white ideal luminance value are provided. Then, proceed to step 63, a predetermined calibration chart is scanned, and the M corresponding actual luminance values of the M pixels are obtained accordingly. Next, proceed to step 64, M predetermined calibrated luminance values are determined according to the M second dark actual luminance values, the M second white actual luminance values, the dark ideal luminance value and the M actual luminance values. Then, proceed to step 65, the corresponding ideal luminance value of the predetermined calibration chart and the M predetermined calibrated luminance values are stored. Next, proceed to step 66, the N–M predetermined calibrated luminance values corresponding to the N–M pixels are calculated according to the M predetermined calibrated luminance values. In step 66, N–M remaining predetermined calibrated luminance values can further be calculated using an interpolation method, an extrapolation method, a linear equation or a non-linear equation according to the M predetermined calibrated luminance values.

The procedures of FIG. 5 can be performed prior to the execution of step 41. Besides, if steps 61-65 of FIG. 6 are performed prior to the execution of step 41, then step 66 is performed in step 43. Consequently, before leaving the factory, the scanner does not need to store the predetermined calibrated luminance value of every pixel. The scanner only needs to sample the predetermined calibrated luminance value of every five pixels. Afterwards, when the scanner scans a document, the predetermined calibrated luminance value of remaining pixels are calculated using an interpolation method, an extrapolation method, a linear equation or a non-linear equation. By doing so, the memory space occupied by the predetermined calibrated luminance values is reduced.

A method of calibrating image luminance values is disclosed in above embodiments of the invention. The design of calibrating the scan luminance value according to an ideal luminance value and a predetermined calibrated luminance value ascertains uniformity of luminance when a document is scanned by a scanner, even if the calibration chart may come off the scanner or the coating of the calibration chart may peel off, or that the distance and angle between the photo-sensing module and the calibration chart when at white-shading correction differ with the distance and angle between the photo-sensing module and the document. However, the invention can prevent image composed of calibrated luminance values from being distorted and greatly enhance scanning quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of calibrating image luminance values for calibrating an image processing device, comprising:
    scanning a calibration chart to obtain a first dark actual luminance value and a first white actual luminance value for calibrating a scan luminance value;
    scanning a document to obtain the scan luminance value;
    providing a white ideal luminance value, a dark ideal luminance value, an ideal luminance value and a predetermined calibrated luminance value, the predetermined calibrated luminance value being obtained by scanning a uniform calibration chart and a predetermined calibration chart; and
    determining a calibrated luminance value according to the first dark actual luminance value, the first white actual luminance value, the white ideal luminance value, the dark ideal luminance value, the ideal luminance value, the predetermined calibrated luminance value and the scan luminance value.

2. The method according to claim 1, wherein, with the first dark actual luminance value, the first white actual luminance value, the white ideal luminance value, the dark ideal luminance value, the ideal luminance value, the predetermined calibrated luminance value, the scan luminance value and the calibrated luminance value denoted by VD1, VW1, TW, TD, IB, SB, FI and FO, FO={TD+[FI−VD1]*[(TW−TD)/(VW1−VD1)]}*(IB/SB).

3. The method according to claim 1, wherein the step of providing the white ideal luminance value, the dark ideal luminance value, the ideal luminance value and the predetermined calibrated luminance value further comprises:
scanning the uniform calibration chart to obtain a second dark actual luminance value and a second white actual luminance value;
providing the dark ideal luminance value and the white ideal luminance value;
scanning the predetermined calibration chart to obtain an actual luminance value;
determining the predetermined calibrated luminance value according to the second dark actual luminance value, the second white actual luminance value, the white ideal luminance value, the dark ideal luminance value and the actual luminance value; and
storing the ideal luminance value corresponding to the predetermined calibration chart and the predetermined calibrated luminance value.

4. The method according to claim 3, wherein, with the second dark actual luminance value, the second white actual luminance value, the white ideal luminance value, the dark ideal luminance value, the actual luminance value and the predetermined calibrated luminance value denoted by VD2, VW2, TW, TD, B1 and SB, SB=TD+(B1−VD2)*[(TW−TD)/(VW2−VD2)].

5. The method according to claim 1, before the step of scanning the calibration chart, further comprising:
scanning the uniform calibration chart to obtain a second dark actual luminance value and a second white actual luminance value;
providing the dark ideal luminance value and the white ideal luminance value
scanning the predetermined calibration chart to obtain an actual luminance value;
determining the predetermined calibrated luminance value according to the second dark actual luminance value, the second white actual luminance value, the white ideal luminance value, the dark ideal luminance value and the actual luminance value; and
storing the ideal luminance value corresponding to the predetermined calibration chart and the predetermined calibrated luminance value.

6. The method according to claim 5, wherein, with the second dark actual luminance value, the second white actual luminance value, the white ideal luminance value, the dark ideal luminance value, the actual luminance value and the predetermined calibrated luminance value denoted by VD2, VW2, TW, TD, B1 and SB, SB=TD+(B1−VD2)*[(TW−TD)/(VW2−VD2)].

7. A method of calibrating image luminance values for calibrating an image processing device including a photosensing module having N pixels, wherein N is a positive integer larger than 2, the method comprising:
scanning a calibration chart to obtain N first dark actual luminance values and N first white actual luminance values for calibrating N scan luminance values;
scanning a document to obtain the N scan luminance values;
providing a white ideal luminance value, a dark ideal luminance value, an ideal luminance value and N predetermined calibrated luminance values, the N predetermined calibrated luminance values being obtained by scanning a uniform calibration chart and a predetermined calibration chart; and
determining N calibrated luminance values according to the N first dark actual luminance values, the N first white actual luminance values, the white ideal luminance value, the dark ideal luminance value, the ideal luminance value, the N predetermined calibrated luminance values and the N scan luminance values.

8. The method according to claim 7, wherein the step of providing the white ideal luminance value, the dark ideal luminance value, the N ideal luminance values and the N predetermined calibrated luminance values further comprises:
scanning the uniform calibration chart to obtain N second dark actual luminance values and N second white actual luminance values;
providing the dark ideal luminance value and the white ideal luminance value;
scanning the predetermined calibration chart to obtain N actual luminance values;
determining the N predetermined calibrated luminance values according to the N second dark actual luminance values, the N second white actual luminance values, the white ideal luminance value, the dark ideal luminance value and the N actual luminance values; and
storing the ideal luminance value corresponding to the predetermined calibration chart and the N predetermined calibrated luminance values.

9. The method according to claim 7, before the step of scanning the calibration chart, further comprising:
scanning the uniform calibration chart to obtain N second dark actual luminance values and N second white actual luminance values;
providing the dark ideal luminance value and the white ideal luminance value;
scanning the predetermined calibration chart to obtain N actual luminance values;
determining the N predetermined calibrated luminance values according to the N second dark actual luminance values, the N second white actual luminance values, the white ideal luminance value, the dark ideal luminance value and the N actual luminance values; and
storing the ideal luminance value corresponding to the predetermined calibration chart and the N predetermined calibrated luminance values.

10. The method according to claim 7, wherein the step of providing the white ideal luminance value, the dark ideal luminance value, the N ideal luminance values and the N predetermined calibrated luminance values further comprises:
scanning the uniform calibration chart, and accordingly obtaining M second dark actual luminance values and M second white actual luminance values corresponding of the M pixels, M is a positive integer smaller than N;
providing the dark ideal luminance value and the white ideal luminance value;
scanning the predetermined calibration chart to obtain M actual luminance values corresponding to the M pixels;
determining the M predetermined calibrated luminance values according to the M second dark actual luminance values, the M second white actual luminance values, the white ideal luminance value, the dark ideal luminance value and the M actual luminance values;
storing the ideal luminance value corresponding to the predetermined calibration chart and the M predetermined calibrated luminance values; and calculating the N–M predetermined calibrated luminance values corresponding to the N–M pixels according to the M predetermined calibrated luminance values.

11. The method according to claim 10, wherein the step of calculating the N–M predetermined calibrated luminance values further comprises:

calculating the other N–M predetermined calibrated luminance values by using an interpolation method according to the M predetermined calibrated luminance values.

12. The method according to claim 10, wherein the step of calculating the N–M predetermined calibrated luminance values further comprises:

calculating the other N–M predetermined calibrated luminance values by using an extrapolation method according to the M predetermined calibrated luminance values.

13. The method according to claim 10, wherein the step of calculating the N–M predetermined calibrated luminance values further comprises:

calculating the N–M predetermined calibrated luminance values by using a linear equation according to the M predetermined calibrated luminance values.

14. The method according to claim 10, wherein the step of calculating the N–M predetermined calibrated luminance values further comprises:

calculating the other N–M predetermined calibrated luminance values by using a non-linear equation according to the M predetermined calibrated luminance values.

15. The method according to claim 7, before the step of scanning the calibration chart, further comprising:

scanning the uniform calibration chart to obtain M second dark actual luminance values and M second white actual luminance values corresponding to the M pixels, wherein M is a positive integer smaller than N;

providing the dark ideal luminance value and the white ideal luminance value;

scanning the predetermined calibration chart to obtain M corresponding actual luminance values of the M pixels;

determining the M predetermined calibrated luminance values according to the M second dark actual luminance values, the M second white actual luminance values, the white ideal luminance value, the dark ideal luminance value and the M actual luminance values; and storing the corresponding ideal luminance value corresponding to the predetermined calibration chart and the M predetermined calibrated luminance values.

16. The method according to claim 15, wherein the step of providing the ideal luminance value and the N predetermined calibrated luminance values further comprises:

calculating the other N–M predetermined calibrated luminance values according to the M predetermined calibrated luminance values.

* * * * *

UNITED STATES PATENT AND TRADEMARK OFFICE
CERTIFICATE OF CORRECTION

| | |
|---|---|
| PATENT NO. | : 7,643,680 B2 |
| APPLICATION NO. | : 11/274231 |
| DATED | : January 5, 2010 |
| INVENTOR(S) | : Chih-Fang Huang |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1062 days.

Signed and Sealed this

Sixteenth Day of November, 2010

David J. Kappos
*Director of the United States Patent and Trademark Office*